United States Patent [19]

Shier

[11] 3,995,599
[45] Dec. 7, 1976

[54] ROTARY COMBUSTION ENGINE EXHAUST GAS RECIRCULATION SYSTEM

[75] Inventor: Richard K. Shier, Livonia, Mich.

[73] Assignee: General Motors Corporation, Detroit, Mich.

[22] Filed: July 31, 1975

[21] Appl. No.: 600,619

[52] U.S. Cl. .............................. 123/8.05; 123/8.13; 60/901; 418/119; 418/143

[51] Int. Cl.² ........................................ F02B 53/04

[58] Field of Search ............... 123/8.13, 8.05, 8.45, 123/119 A; 60/901, 39.52, 278; 418/119, 143, 189

[56] References Cited

UNITED STATES PATENTS

| | | | |
|---|---|---|---|
| 3,447,512 | 6/1969 | Winkelmann | 123/8.05 |
| 3,795,228 | 3/1974 | Shimizu | 60/901 |
| 3,897,755 | 8/1975 | Hayashida | 123/8.13 |
| 3,906,907 | 9/1975 | Canale | 123/8.13 |

Primary Examiner—Clarence R. Gordon
Attorney, Agent, or Firm—Ronald L. Phillips

[57] ABSTRACT

A rotary combustion engine having a planetary rotor and a side intake port is provided with an internal exhaust gas recirculation system that is operable to connect the trailing region of the working chambers and the space below the trailing apex seal to the annular space between the side seals and oil seals on one rotor side only when the chambers near the end of the exhaust phase whereby the differential between the pressure of the exhaust gases and the vacuum of the inlet mixture causes the exhaust gases rich in unburned hydrocarbon that are in the trailing regions of the chamber during the exhaust phase to flow through the annular space to the intake port and thereafter be recirculated through the compression and expansion phase.

4 Claims, 5 Drawing Figures

ROTARY COMBUSTION ENGINE EXHAUST GAS RECIRCULATION SYSTEM

This invention relates to a spark ignition rotary combustion engine exhaust gas recirculation system and more particularly to such a system wherein exhaust gas recirculation to engine inlet is effected by channels and grooves and the available annular space between the side seals and the oil seals on both rotor sides.

In the currently produced rotary combustion engine of the planetary rotor type as herein disclosed it is known that certain undesired exhaust gas emissions can be reduced like in reciprocating piston engines with exhaust gas recirculation. In piston engines, this process has the effect of mainly reducing $NO_x$ emission and the same is true in rotary engines when the recirculated gas is extracted downstream of the exhaust port. However, in the rotary engine the chambers move with the rotor unlike the stationary chambers in a piston engine and it has been found that there can be a substantially higher percentage of unburned HC in the trailing region of the chambers and also in the space below the trailing apex seal during the exhaust phase. Therefore substantial HC reduction which is so hard sought in this engine could result from recirculating exhaust gases primarily from the trailing region of the working chambers and the space below the trailing apex seal during the exhaust phase provided this can be efficiently accomplished and hopefully with minimum engine modifications.

The present invention meets this task by utilizing the existing side intake port arrangement and certain of the seals on the rotor which are in different locations during the compression and exhaust phases of the working chambers to help provide internal bypass in the engine to effect flow of the exhaust gases rich in unburned hydrocarbons which are in the trailing region of the chambers during the exhaust phase to flow to the intake port and thereafter be recirculated through the intake, compression and expansion phases of the engine. This is accomplished structurally with very simple modifications which include grooves or slots that are formed in both of the stationary side walls opposite the rotor sides in positions so that they are operable to connect the trailing region of the chambers and also the space below the trailing apex seal to the sealed space between the side seals and oil seals on the rotor sides when the chambers are nearing the end of the exhaust phase. These sealed annular spaces are open to the intake port almost constantly through a system of grooves on the rotor sides and an extension of the inlet port. Thus the differential between the pressure of the exhaust gases and the vacuum of the inlet mixture is used to cause the exhaust gases rich in unburned hydrocarbons that are in the trailing region of the chambers during the exhaust phase to flow through the annular space to the intake port and thereafter be recirculated through the intake, compression and expansion phases. In another embodiment, the recirculation passage is provided by a notch formed in the trailing end of the side seals.

An object of the present invention is to provide a new and improved rotary combustion engine exhaust gas recirculation system.

Another object is to provide in a rotary combustion engine with a side intake port an exhaust gas recirculation system wherein exhaust gases rich in unburned hydrocarbons in the trailing region of the chambers and also below the trailing apex seal during the exhaust phase are directed via the space between the side seals and oil seals on the rotor sides to the side intake port whereafter they are recirculated through the intake, compression and expansion phases.

Another object is to provide in a rotary combustion engine an exhaust gas recirculation passage in the stationary side walls that operates to connect the trailing region of the chambers and the space below the trailing apex seal to the annular space between the oil seals and side seals on the rotor sides only when the chambers are nearing the end of the exhaust phase to thereby flow exhaust gases rich in unburned hydrocarbons in the trailing region of the chambers to the intake port whereafter they are recirculated through the intake, compression and expansion phases.

Another object is to provide in a rotary combustion engine an exhaust gas recirculation passage in the trailing end of the side seals that operates to connect the trailing region of the chambers to the annular space between the oil seals and side seals on the rotor sides to thereby flow exhaust gases rich in unburned hydrocarbons from the trailing region of the chambers to the side intake port whereafter they are recirculated through the intake, compression and expansion phases.

These and other objects of the present invention will be more apparent from the following description and drawing in which.

Figure 1:
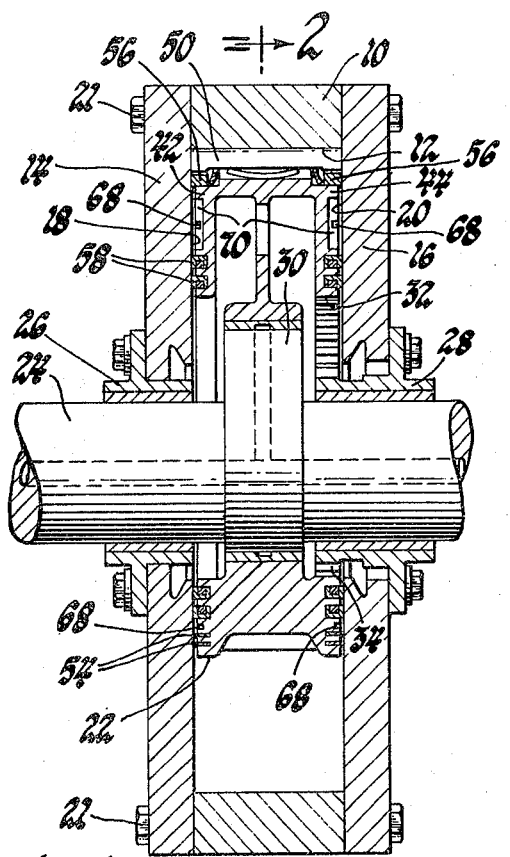
FIG. 1 is a longitudinal view with parts in section of a rotary combustion engine having an exhaust gas recirculation system according to the present invention.
Figure 2:
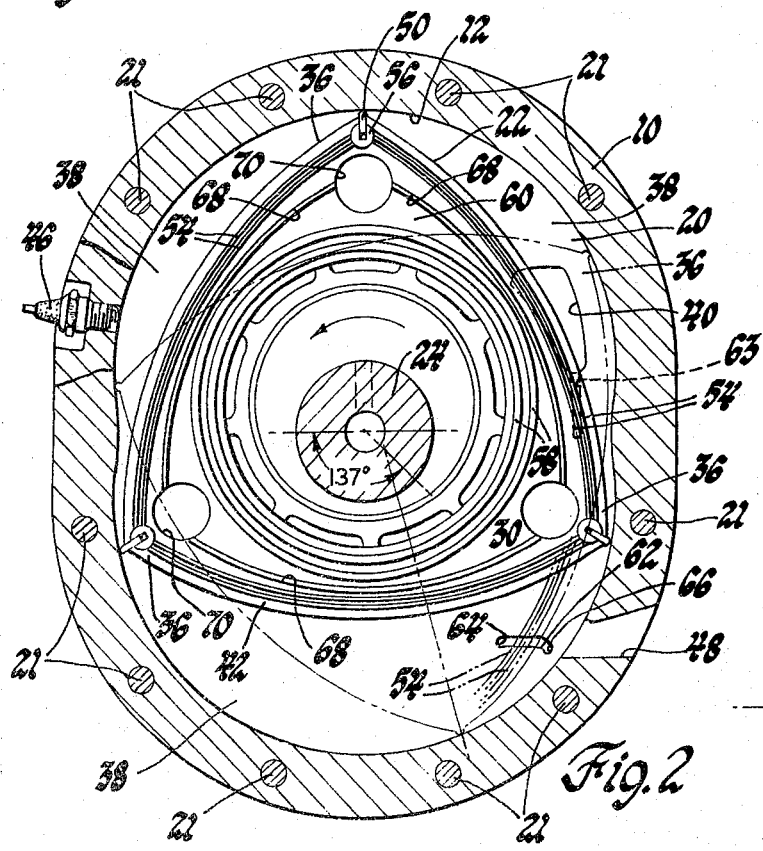
FIG. 2 is a view taken along the line 2—2 in FIG. 1 but with the rotor shown in elevation.

The exhaust gas recirculation system according to the present invention is disclosed in one embodiment in the rotary combustion engine shown in FIGS. 1 and 2. The engine comprises a rotor housing 10 having an inner peripheral wall 12 and a pair of end housings 14 and 16 having oppositely facing side walls 18 and 20. The housings are secured together by bolts 21 and the inner peripheral wall 12 commonly conforms to a curve outside of and parallel to a two-lobe epitrochoid and cooperates with the side walls 18 and 20 to provide a cavity in which a generally triangularly shaped rotor 22 is mounted. A crankshaft 24 extends through the cavity and is journaled in collars 26 and 28 which are bolted to the end housings 14 and 16. The rotor 22 is rotatably supported on an eccentric 30 formed on the crankshaft 24 and has a concentrically located internal tooth rotary phasing gear 32 on one side which meshes with an external tooth stationary phasing gear 34 which is concentric with the crankshaft and is formed on the inboard end of collar 28. The rotary phasing gear 32 has one and one-half times the number of teeth as the stationary phasing gear 34 so that there is enforced a fixed phase relationship between the rotor and the crankshaft and the housing structure wherein each of the three rotor apexes 36 remain adjacent to the peripheral wall 12 as the rotor rotates and there is defined between these apexes a total of three expansible chambers 38 that move with the rotor while expanding and contracting twice during each rotor revolution in fixed relation to the housing.

A combustible mixture is delivered to the chambers 38 through oppositely facing side intake ports 40 formed in the side walls 18 and 20 with the intake ports being arranged such that they are opened to the chambers past the respective rotor sides 42 and 44 as the chambers expand in an intake phase and are thereafter closed by the rotor sides when these chambers then contract to compress the mixture in a compression phase as the rotor turns in the direction of the arrow. At the end of the compression phase, the compressed mixture is ignited by a spark plug 46 mounted on the rotor housing 10 whereupon the chambers expand in a power or expansion phase and thereafter are exhausted as they contract in an exhaust phase by an exhaust port 48 in the rotor housing which is traversed by the rotor apexes.

Typically, the chambers 38 are sealed by an arrangement comprising an apex seal 50 mounted in a slot across each rotor apex, a pair of parallel side seals 54 mounted in grooves in each rotor side adjacent each rotor flank and a corner seal 56 mounted in a hole in each rotor side at each apex that provides a sealing link between the adjacent ends of the side seals and apex seal at each apex. In this arrangement the apex seals 50 are spring biased radially outward to engage the peripheral wall 12 and the corner seals 56 and side seals 54 are spring biased axially outward to engage the opposite side wall. In addition to the gas sealing arrangement, there is also normally provided a pair of oil seals 58 mounted in concentric grooves in each rotor side which are spring biased axially outward to engage the opposite side wall to prevent the oil used for lubrication of the crankshaft, rotor, etc., from reaching the working chambers.

In such an arrangement the side seals 54 slide over the intake port 40 on their side but the oil seals 58 do not and the annular space 60 thus formed on each rotor side between the side seals 54 and oil seals 58 is therefore periodically opened to the intake port 40 on that rotor side during the intake phase of each working chamber that occurs during each rotor revolution. This condition is shown in FIG. 2 and occurs as demonstrated by the full-line rotor position when the radial width of the intake port spans or bridges the side seals 54 during the intake phase of a chamber and ceases when this chamber enters its compression phase as demonstrated by the phantom-line rotor position.

Figure 3:
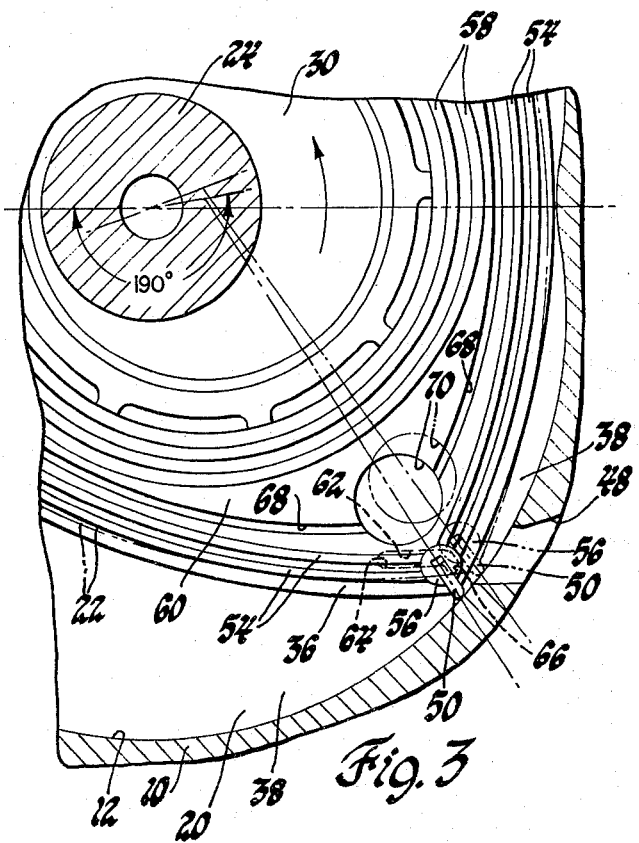
FIG. 3 is an enlarged view of a portion of FIG. 2 but with different rotor positions that demonstrate the operation of the system.
Figure 4:
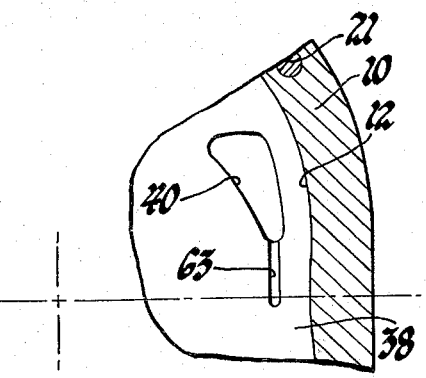
FIG. 4 is a part of FIG. 2 with the rotor removed to show the groove which extends from the intake port to the rotor housing minor centerline.

The present invention utilizes the available sealed spaces 60 to help provide an internal exhaust gas recirculation system that is effective to bypass the exhaust gases rich in unburned hydrocarbons in the trailing region of the chambers during their exhaust phase to the intake ports for recirculation through the intake, compression and expansion phases. This is very simply accomplished in the existing structure by casting or machining a slot or groove 62 in the side walls 18 and 20 close to the exhaust port 48 as shown in FIGS. 2 and 3 and also a slot or groove 63 in these side walls extending from the intake ports 40 to the rotor housing minor centerline as shown in FIG. 4. The groove 62 extends in a generally radial direction and has a length such that as the rotor rotates it is periodically spanned by the side seals 54 sealing the exhausting chamber but not by the oil seals 58 to thereby provide a recirculation passage between the annular space 60 on this rotor side and the associated working chamber which is then undergoing its exhaust phase. Furthermore, the angular location and shape of the groove 62 is such that the connection it provides between the then exhausting working chamber and the annular space 60 is timed to commence in the trailing region of the exhaust working chamber and terminate at or near the end of the exhaust phase of this chamber. For example, in one test engine the gas recirculation groove 62 was formed with an angled shape and located so as to provide the connection starting at the radially inner end 64 of groove 62 at 137° after-top-dead-center (A.T.D.C.) crank position as shown by the phantom-line rotor position in FIG. 2 with this action then continuing to 190° A.T.D.C. where the trailing corner seal 56 then proceeds to cover this groove at its radially outer bent end 66 as shown by the full line rotor position in FIG. 3 whereafter on continued rotor rotation this bypass or internal exhaust gas recirculation connection is discontinued or blocked as shown by the phantom-line rotor position in FIG. 3. The high pressure gases occurring in the chamber trailing the chamber from which gas is being extracted for recirculation is not bled in any way by the gas recirculation groove, it being this factor together with the side seal and corner seal configuration that determines the shape and angular position of the recirculation groove for maximum open time as can be seen in FIG. 3.

With this arrangement and then as each of the working chambers undergoes its exhaust phase, some of the exhaust gases in the trailing region are permitted to pass through the gas recirculation groove 62 to the annular space 60 between the side seals and oil seals on each rotor side which is almost continuously connected with the aid of groove 63 to the intake port 40. To assure a free flow path, there are provided grooves 68 in each rotor side that each extend between the side seals and oil seals and connect one normally existing balance hole 70 at each apex with another. The differential between the pressure of the exhaust gases in the annular space 60 and the vacuum of the inlet mixture causes these bypassed exhaust gases which are rich in unburned hydrocarbons to flow into the intake port and thereafter be recirculated through the intake, compression and exhaust phases. Furthermore, it will be appreciated that this exhaust gas recirculation is obtained internally before the addition of any air injection and therefore the recirculated portion is more effective in the reduction of $NO_x$. In addition, the flow of recirculated exhaust gas across the trailing portion of the side seals can also act to flush unburned fuel found in this area back to the intake. A further feature of the exhaust gas recirculation grooves 62 is that as the rotor apexes pass, these grooves also act to connect the space below the trailing apex seal in the respective rotor slot past the associated corner seal 56 to the annular space 60 on this rotor side and thus also back to intake thereby flushing any unburned or quenched fuel mixture from these areas.

Figure 5:
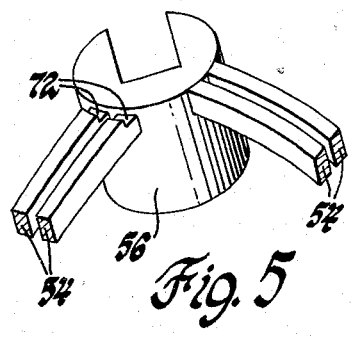
FIG. 5 is an enlarged perspective view of part of the engine's corner seal and side seal arrangement showing another embodiment of the exhaust gas recirculation system according to the present invention.

Another embodiment of the internal exhaust gas recirculation system according to the present invention is shown in FIG. 5 and recognizes that in this type engine environment and as the rotor rotates, the side seals 54 are normally in constant contact at their trailing end with the trailing corner seal 56. Furthermore, as the rotor rotates, it scrapes a layer of unburned hydrocarbons off the metal surfaces and as a result, there is HC accumulation near the trailing apex seal and corner seals. In this embodiment the trailing end of each of the side seals 54 is provided with a notch 72 on the sealing side (the side facing the opposing side wall) to thus provide a continuous gas recirculation passage past the side seals between the trailing region of the working chambers and the annular space 60 rather than the periodic connections provided by the exhaust gas recirculation passages 62 in the previous embodiment. The gas recirculation notches 72 will also permit some blowby unlike the gas recirculation grooves 62 in the side walls, but since this blowby is where the mixture has been found to be rich and this blowby is also recirculated, the net effect can remain an improvement. In lieu of notching the trailing ends, these side seals can be sprung or otherwise loaded against the leading corner seal to provide the same action.

The above described embodiments are illustrative of the invention which may be modified within the scope of the appended claims.

I claim:

1. A rotary combustion engine comprising housing means having an internal peripheral wall and oppositely facing side walls, a rotor rotatably mounted in said housing means with sides facing said side walls and flanks having apexes that remain adjacent said peripheral wall as said rotor rotates, said rotor and said walls cooperatively providing a plurality of expansible chambers, an intake port in at least one of said side walls openable by one of said rotor sides to deliver a combustible gaseous mixture to said chambers as they expand in an intake phase, ignition means for igniting the mixture in said chambers following a compression phase whereupon they expand in an expansion phase, an exhaust port openable by said rotor to exhaust said chambers as they contract in an exhaust phase, gas seal means mounted on said rotor sides sealingly engaging the oppositely facing side walls for providing sealing adjacent the flanks of said rotor wherein the gas seal means on said one rotor side passes over said intake port during the opening and closing of said intake port to said chambers, annular oil seal means mounted on said rotor sides radially inward of said gas seal means engaging the oppositely facing side walls wherein the oil seal means on said one rotor side is always radially inward of and never passes over said intake port whereby there is provided a sealed annular space between the gas seal means and oil seal means on said one rotor side that is open to said intake port during the intake phase of said chambers, and exhaust gas recirculation passage means for connecting the trailing region of said chambers to said sealed annular space only when said chambers are nearing the end of the exhaust phase whereby the differential between the pressure of the exhaust gases and the vacuum of the inlet mixture causes exhaust gases in the trailing region of the chambers during the exhaust phase to flow through said sealed annular space to said intake port and thereafter be recirculated through the intake, compression and expansion phases.

2. A rotary combustion engine comprising housing means having an internal peripheral wall and oppositely facing side walls, a rotor rotatably mounted in said housing means with sides facing said side walls and flanks having apexes that remain adjacent said peripheral wall as said rotor rotates, said rotor and said walls cooperatively providing a plurality of expansible chambers, an intake port in at least one of said side walls openable by one of said rotor sides to deliver a combustible gaseous mixture to said chambers as they expand in an intake phase, ignition means for igniting the mixture in said chambers following a compression phase whereupon they expand in an expansion phase, an exhaust port openable by said rotor to exhaust said chambers as they contract in an exhaust phase, gas seal means mounted on said rotor sealing said chambers including apex seals mounted in slots in said rotor apexes sealingly engaging said peripheral wall and side seals and corner seals mounted on said rotor sides sealingly engaging the oppositely facing side walls wherein the side seals on said one rotor side pass over said intake port during the opening and closing of said intake port to said chambers, annular oil seal means mounted on said rotor sides radially inward of said side seals and corner seals sealingly engaging the oppositely facing side walls wherein the oil seal means on said one rotor side is always radially inward of and never passes over said intake port whereby there is provided a sealed annular space between the side and corner seals and oil seal means on said one rotor side that is open to said intake port during the intake phase of said chambers and an exhaust gas recirculation passage in said one side wall for connecting the space in the slot below the trailing apex seal past the trailing corner seal only when said chambers are nearing the end of the exhaust phase whereby the differential between the pressure of the exhaust gases and the vacuum of the inlet mixture causes any unburned mixture in the space below the apex seals to flow through said sealed annular space to said intake port and thereafter be recirculated through the intake, compression and expansion phases.

3. A rotary combustion engine comprising housing means having an internal peripheral wall and oppositely facing side walls, a rotor rotatably mounted in said housing means with sides facing said side walls and flanks having apexes that remain adjacent said peripheral wall as said rotor rotates, said rotor and said walls cooperatively providing a plurality of expansible chambers, an intake port in at least one of said side walls openable by one of said rotor sides to deliver a combustible gaseous mixture to said chambers as they expand in an intake phase, ignition means for igniting the mixture in said chambers following a compression phase whereupon they expand in an expansion phase, an exhaust port openable by said rotor to exhaust said chambers as they contract in an exhaust phase, gas seal means mounted on said rotor sides sealingly engaging the oppositely facing side walls for providing sealing adjacent the flanks of said rotor wherein the gas seal means on said one rotor side passes over said intake port during the opening and closing of said intake port to said chambers, annular oil seal means mounted on said rotor sides radially inward of said gas seal means engaging the oppositely facing side walls wherein the oil seal means on said one rotor side is always radially inward of and never passes over said intake port whereby there is provided a sealed annular space between the gas seal means and oil seal means on said one rotor side that is open to said intake port during the intake phase of said chambers, and an exhaust gas recirculation passage in said one side wall for connecting a trailing region of said chambers past said gas seal means on said one rotor side to said sealed annular space only when said chambers are nearing the end of the exhaust phase whereby the differential between the pressure of the exhaust gases and the vacuum of the inlet mixture causes exhaust gases in the trailing region of the chambers during the exhaust phase to flow through said sealed annular space to said intake port and thereafter be recirculated through the intake, compression and expansion phases.

4. A rotary combustion engine comprising housing means having an internal peripheral wall and oppositely facing side walls, a rotor rotatably mounted in said housing means with sides facing said side walls and flanks having apexes that remain adjacent said peripheral wall as said rotor rotates, said rotor and said walls cooperatively providing a plurality of expansible chambers, an intake port in at least one of said side walls openable by one of said rotor sides to deliver a combustible gaseous mixture to said chambers as they expand in an intake phase, ignition means for igniting the mixture in said chambers following a compression phase whereupon they expand in an expansion phase, an exhaust port openable by said rotor to exhaust said chambers as they contract in an exhaust phase, gas seal means mounted on said rotor sealing said chambers including apex seals mounted in slots in said rotor apexes sealingly engaging said peripheral wall and side seals and corner seals mounted on said rotor sides sealingly engaging the oppositely facing side walls wherein the side seals on said one rotor side pass over said intake port during the opening and closing of said intake port to said chambers, annular oil seal means mounted on said rotor sides radially inward of said side seals and corner seals sealingly engaging the oppositely facing side walls wherein the oil seal means on said one rotor side is always radially inward of and never passes over said intake port whereby there is provided a sealed annular space between the side and corner seals and oil seal means on said one rotor side that is open to said intake port during the intake phase of said chambers, and an exhaust gas recirculation passage in said one side wall for connecting the trailing region of said chambers past the associated side seal on said one rotor side to said sealed annular space and also connecting the space in the slot below the trailing apex seal past the trailing corner seal only when said chambers are nearing the end of the exhaust phase whereby the differential between the pressure of the exhaust gases and the vacuum of the inlet mixture causes exhaust gases in the trailing region of the chambers during the exhaust phase and any unburned mixture in the space below the apex seals to flow through said sealed annular space to said intake port and thereafter be recirculated through the intake, compression and expansion phases.

* * * * *